R. W. SCOTT & L. A. COSTELLO.
HOSIERY.
APPLICATION FILED JUNE 4, 1910.
1,087,690.
Patented Feb. 17, 1914.
3 SHEETS—SHEET 1.
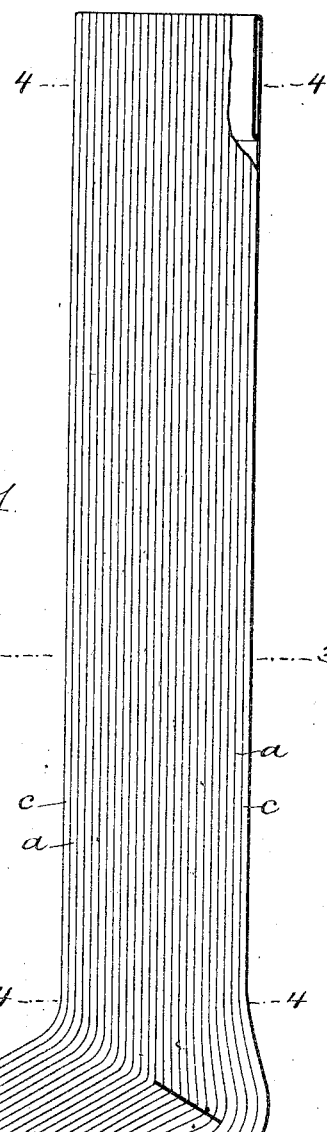
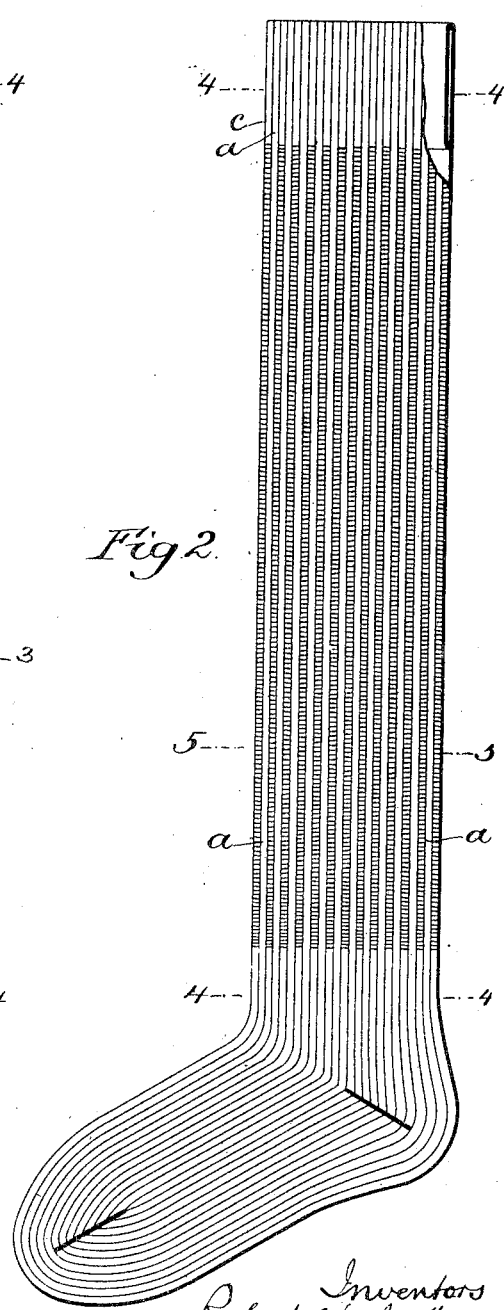

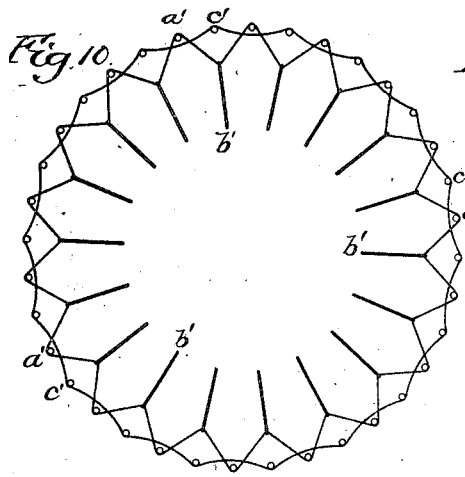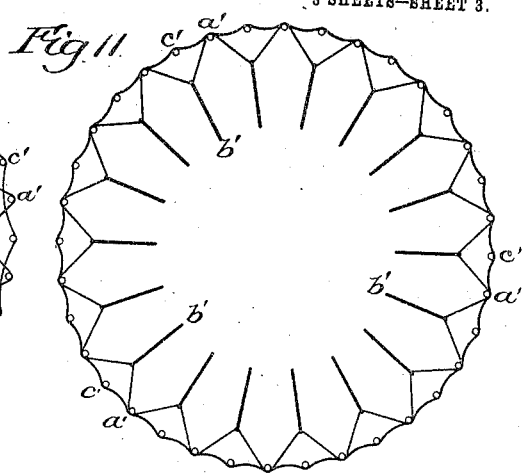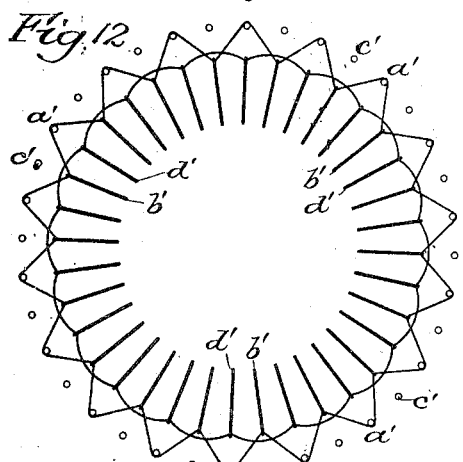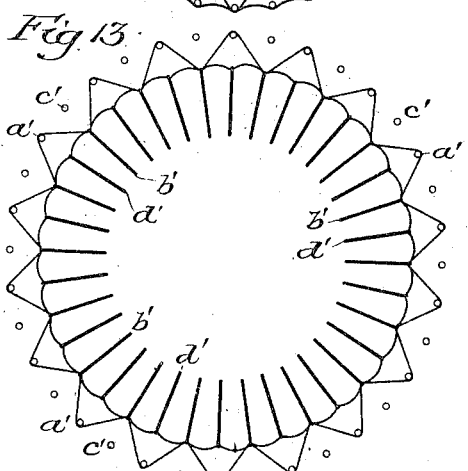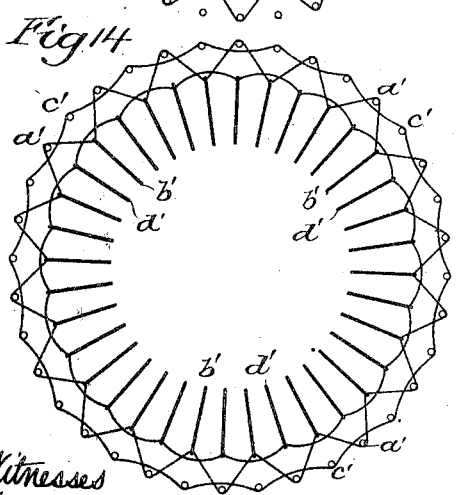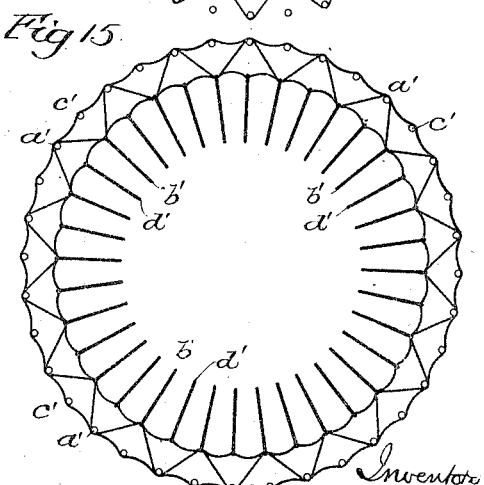

UNITED STATES PATENT OFFICE.

ROBERT W. SCOTT, OF LEEDS POINT, NEW JERSEY, AND LORETTO A. COSTELLO, OF PHILADELPHIA, PENNSYLVANIA, ASSIGNORS, BY MESNE ASSIGNMENTS, TO SCOTT & WILLIAMS, INCORPORATED, OF CAMDEN, NEW JERSEY, A CORPORATION OF NEW JERSEY.

HOSIERY.

1,087,690.   Specification of Letters Patent.   Patented Feb. 17, 1914.

Application filed June 4, 1910.  Serial No. 565,132.

*To all whom it may concern:*

Be it known that we, ROBERT W. SCOTT and LORETTO A. COSTELLO, both citizens of the United States, residing, respectively, in Leeds Point, Atlantic county, New Jersey, and Philadelphia, Pennsylvania, have invented certain Improvements in Hosiery, of which the following is a specification.

Our invention relates to that class of stockings which have a greater number of wales in the leg than in the foot, and especially to stockings of that class in which the discontinued wales of the leg are interknitted with wales of the foot by transfer of stitches, one object of our invention being to effect such transfer without shogging of the stitches, another object being to provide the same number of wales on one or both faces of the leg web as in the foot web, a further object being to produce a heavier web in the leg than in the foot, another object being to produce a rib effect on the outer face of the leg web, and a still further object being to provide a turned welt of plain web at the top of a stocking having a leg of composite web. These objects we attain in the manner hereinafter set forth, reference being had to the accompanying drawings, in which—

Figure 3:
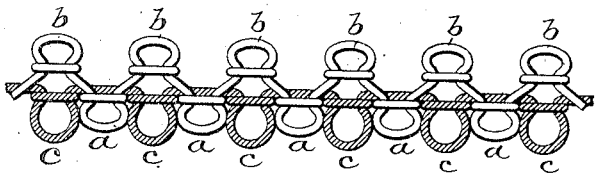
Figure 4:
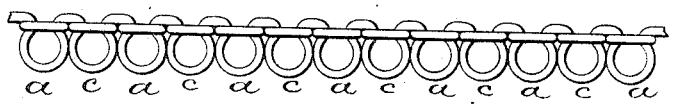
Figure 5:
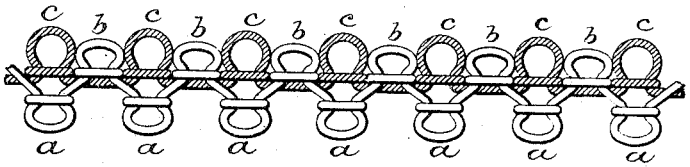
Figure 6:
Figure 7:
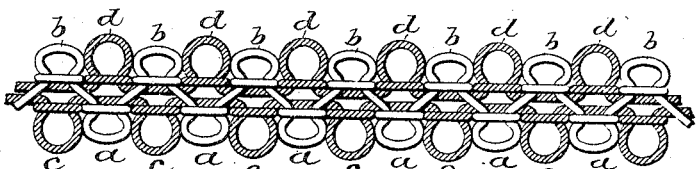

Figures 1 and 2 are side views of stockings made in accordance with our invention; Fig. 3 is an exaggerated sectional view taken on the line 3—3, Fig. 1; Fig. 4 is an exaggerated sectional view taken on either of the lines 4—4, Fig. 1 or Fig. 2; Fig. 5 is an exaggerated sectional view taken on the line 5—5, Fig. 2; Fig. 6 is an exaggerated sectional view of a modified form of welt web; Fig. 7 is an exaggerated section of the leg web of another type of stocking embodying our invention, and Figs. 8, 9, 10, 11, 12, 13, 14 and 15 are diagrams illustrating the arrangement of needles in a circular knitting machine and showing various methods of knitting which may be adopted in carrying out our invention.

The stocking shown in Fig. 1 has at the top a turned welt composed of plain web stitches $a$ $c$, as shown in Fig. 4, knitted on successive needles, or two webs each knitted on alternate needles, as shown in Fig. 6. The leg of the stocking is composed of ribbed web with alternating stitches $a$ and $b$, the stitches $a$ being on the outer face of the web and the stitches $b$ on the inner face of the same. Combined with this ribbed web is a plain web whose stitches $c$ alternate with stitches $a$ on the outer face of the ribbed web, as shown in Fig. 3. The foot is composed of plain web having continuous courses of stitches $a$ $c$, as shown in Fig. 4, and at the junction of the leg and foot webs stitches of the ribbing wales $b$ are intermitted with the wales $c$.

In the stocking shown in Fig. 2, the disposition of the stitches in the leg web is reversed, the stitches $c$ of the plain web being interposed between the stitches $b$ of the ribbed web on the inner face of the leg, as shown in Fig. 5, and, at the junction of the leg and foot webs, stitches of the wales $c$ are interknitted with the wales $a$, and the direction of the stitches in the wales $b$ is reversed.

Figure 8:
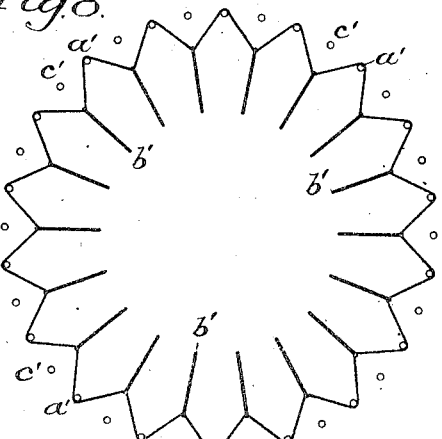

The stockings are knitted upon a machine having two needle carriers, the needles of one carrier drawing stitches in one direction and those of the other carrier drawing stitches in the opposite direction, after the manner of an ordinary rib knitting machine, and while said stockings may be produced upon either straight or circular machines, they will be knitted mainly upon circular knitting machines, and will have seamless tubular webs in the leg and foot, hence we will, for convenience, refer to certain of the needles as "cylinder" needles and to the others as "dial" needles. In knitting the stocking shown in Fig. 1, these needles may be arranged as shown in Fig. 8, $a'$ and $c'$ representing alternating cylinder needles and $b'$ representing dial needles in line with the cylinder needles $c'$. While the stocking may be produced upon a machine having but a single feed, which delivers its yarn to the sets of needles in succession, such machine will, by preference, be provided with a plurality of yarn feeds.

Figure 9:
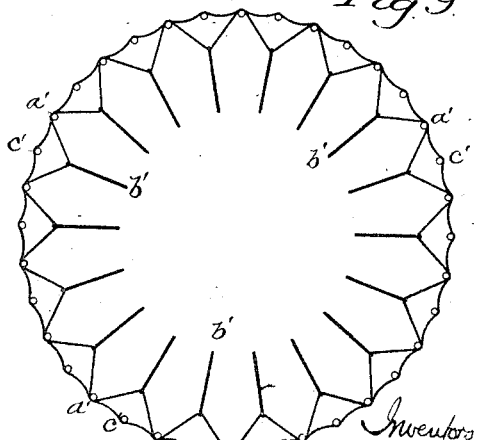

In order to knit the welt, the yarn is first fed to the needles $a'$ $b'$, the needles $b'$ are then retired but retain their stitches and the yarn is then fed to the needles $a'$ $c'$ as shown in Fig. 9, until sufficient length of plain single web (Fig. 4) for the welt has been produced, whereupon the cylinder needles $c'$ are retired but retain their stitches and the first course of the leg web is knitted upon the needles $a'$ $b'$, the loops or stitches first formed upon the needles $b'$ being engaged by the stitches formed upon the needles $b'$ in knitting this first course of the leg web, thereby serving to tie in the turned edge of the welt. The next course is knitted upon the needles $c'$ only, as shown in Fig. 10, and the formation of alternate rib and plain courses is then proceeded with in the same manner until the knitting of the leg web has been completed.

As an alternative to the method described of closing the welt, the dial needles $b'$ may be projected to such an extent as to carry their stitches into position to be engaged by the cylinder needles $c'$ and the latter may then be projected so as to engage said stitches, the dial needles being then retired so as to cast the stitches from them and the knitting of the alternate rib and plain courses for the leg web being then proceeded with as before. The method first described is, however, preferred as it dispenses with the necessity of transferring stitches from one needle to another.

In producing the plain web the wales $a$ may be knitted independently of the wales $c$, one course being knitted upon the cylinder needles $a'$ only and the next course being knitted upon the cylinder needles $c'$ only, such web being illustrated in Fig. 6.

In changing from the leg web to the foot web, the dial needles $b'$ will be projected so as to carry stitches of the wales produced thereon into range of the cylinder needles $c'$, and the latter will then be projected so as to enter the stitches in line therewith and the dial needles will be withdrawn so as to cast from them the stitches which they carry, the operation being what we term a "straight" transfer, which can be very readily effected, since no shogging operation of the needles or of the stitches upon them is required. By preference, also, the dial needles $b'$ are projected to such an extent that the stitches which are drawn into line with the cylinder needles $c'$ are stitches produced previously to those actually carried by the dial needles at the time of transfer, as it has been found in practice that more effective transfer can be effected in this manner than when the stitches last formed upon the dial needles are the ones to be transferred. A web produced in this manner has the same number of courses in each wale of the leg web, but we prefer, in some cases, to provide a greater number of courses in the wales $a$ of the ribbed web than are present in the wales $b$ of the same, or in the wales $c$ of the plain web. In order to produce a web of this character, the method of knitting shown in Fig. 11 is adopted, yarn from one feed being delivered alternately to the needles $a'$ and $b'$ to produce the ribbed web and yarn from the next feed being delivered to the cylinder needles $a'$ $c'$, to produce a plain web, the transfer being effected in the same manner as that before described.

In many cases, it may be desirable to produce a ribbed effect upon the outside of the leg tube, and, in this case, we adopt the method of knitting shown in Fig. 12 or Fig. 13. In the machine there shown, there are as many needles in the dial as in the cylinder, and, in knitting the leg tube, yarn from the first feed is delivered alternately to cylinder needles $a'$ and dial needles $b'$ to produce the ribbed web, yarn from the second feed being delivered to the dial needles $d'$, as shown in Fig. 12, to produce a plain web with its wales located between the wales $b$ of the ribbed web on the inside of the leg tube, as shown in Fig. 5. In changing from the leg web to the foot web, all of the dial needles are projected, the needles $b'$ transferring stitches to the theretofore inactive cylinder needles $c'$, and the dial needles $d'$ transferring stitches to the theretofore active cylinder needles $a'$. This web may also be modified to produce twice as many courses of stitches in the wales $b$ as there are in the other wales of the web by knitting upon all of the dial needles, as shown in Fig. 13, to produce the plain web which is combined with the ribbed web.

In all of the leg webs thus far described, the plain web is combined with but one face of the ribbed web but said plain web can be combined with both faces of the ribbed web, if desired, as shown in Fig. 7, the disposition of the needles and the method of knitting in this case being represented in Figs. 14 and 15. In knitting the web in accordance with the method shown in Fig. 14, yarn from the first feed is delivered alternately to the needles $a'$ and $b'$, to produce the ribbed web, yarn from the next feed is delivered to the cylinder needles $c'$ to produce the plain web which is combined with one face of the ribbed web, and yarn from the third feed is delivered to the dial needles $d'$ to produce the plain web which is combined with the other face of the ribbed web, or, where it is desired to produce twice as many courses of stitches in the rib wales as in the wales of plain web, the yarn from the second feed may be fed to all of the cylinder needles, and the yarn from the third feed may be fed to all of the dial needles, as shown in Fig. 15, the method of effecting change from the leg web to the foot web in either of the fabrics produced as in Figs. 13, 14 and 15, being to transfer stitches of the dial needle wales to corresponding cylinder needles by a straight transfer, as above described.

In knitting the plain foot web, the cylinder needles may receive yarn from either or both, but preferably from both, of the yarn feeds which delivered yarn to said needles during the knitting of the composite leg web.

Even when the leg web presents, on the outer face or on each face, as many wales as there are in the foot web, it is possible, by varying the draft or tension upon the wales of the different webs, to impart to said outer face or to each face, an effect resembling that of a ribbed fabric, but where a pronounced rib effect on the outside of the leg web is desired, said outer face of the leg web presents only the rib stitches, as shown in Fig. 5. In this case, however, the inner face of the leg web presents a surface more nearly resembling that of the plain foot web than would the inner face of a true ribbed web. In any case, the leg web is heavier than the foot web and presents a closer texture than an ordinary ribbed web having a greater number of wales than the plain foot web. Even when the leg web is widened by slacking its stitches, the web will not present the relatively open texture which would result from a corresponding slackening of the stitches of an ordinary single plain web, or an ordinary ribbed web.

In order to provide for the automatic production of the stocking, the plain foot web is knitted by a yarn continuous with that which knitted one or both of the webs of the leg, such continuous yarn being composed either of one strand or a plurality of strands, or it may have additional strands added to it in knitting certain portions of the web, the term "continuous" not necessarily implying unbroken continuity, as different yarns may be used so long as the meeting ends of said yarns overlap or provide for a continuous feed of yarn to the needles of one and the same machine.

We claim:

1. A stocking having a leg composed of two or more interknitted webs and a turned welt of plain web integrally united at its turned edge to that one of the leg webs other than the one of which the stitches of the welt form part.

2. A stocking having a leg composed of ribbed web and plain web combined with said ribbed web, and a turned welt composed of plain web integrally united at its turned edge to the plain web of the leg.

3. A stocking having a leg composed of ribbed web and a plain web combined with each face of said ribbed web, and a turned welt composed of plain web having its turned edge integrally united to the leg web.

4. A stocking having, in the leg, a ribbed web with plain web wales between rib wales, and, in the foot, a plain web with fewer wales than in the leg, said plain foot web having wales continuous with wales of one face of the ribbed web of the leg and alternating wales continuous with plain web wales of the leg.

5. A stocking having, in the leg, a ribbed web with plain web wales between rib wales, and, in the foot, a plain web with fewer wales than in the leg, said plain foot web having wales continuous with wales of one face of the ribbed web of the leg, the wales of the other face of said ribbed web being interknit by a straight transfer with alternating wales of the plain foot web which correspond with plain web wales of the leg.

6. A stocking having, in the leg, a ribbed web with plain web wales between rib wales of each face, and, in the foot, a plain web with fewer wales than in the leg, said plain foot web being continuous with one or more of the leg webs, and the discontinued wales of the leg web being interknitted with wales of the foot web.

7. A stocking having, in the leg, a ribbed web with plain web wales between rib wales of each face, and, in the foot, a plain web with fewer wales than in the leg, said plain foot web being continuous with one or more of the leg webs, and the discontinued wales of the leg web being interknitted by a straight transfer with wales of the foot web.

8. A stocking having, in the leg, a ribbed web with plain web wales between rib wales of the leg, and, in the foot, a plain web with fewer wales than in the leg, said plain foot web being continuous with one or more of the leg webs, and the discontinued wales of the leg web being interknitted with wales of the foot web, and certain standing wales of the leg web having their stitches reversed at the point of change.

9. A stocking having, in the leg, a ribbed web with plain web wales between rib wales of the leg, and, in the foot, a plain web with fewer wales than in the leg, said plain foot web being continuous with one or more of the leg webs, and the discontinued wales of the leg web being interknitted by a straight transfer with wales of the foot web, and certain standing wales of the leg web having their stitches reversed at the point of change also by a straight transfer.

In testimony whereof, we have signed our names to this specification in the presence of two subscribing witnesses.

ROBERT W. SCOTT.
LORETTO A. COSTELLO.

Witnesses:
KATE A. BEADLE,
HAMILTON D. TURNER.